D. E. BOHANNON.
RESILIENT WHEEL.
APPLICATION FILED FEB. 3, 1916.
1,249,273.
Patented Dec. 4, 1917.
2 SHEETS—SHEET 1.
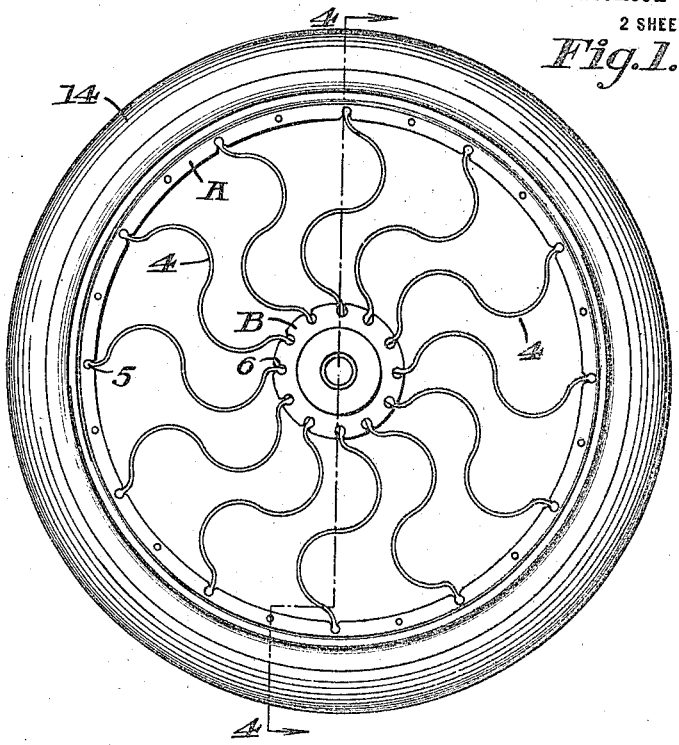
Fig. 1.
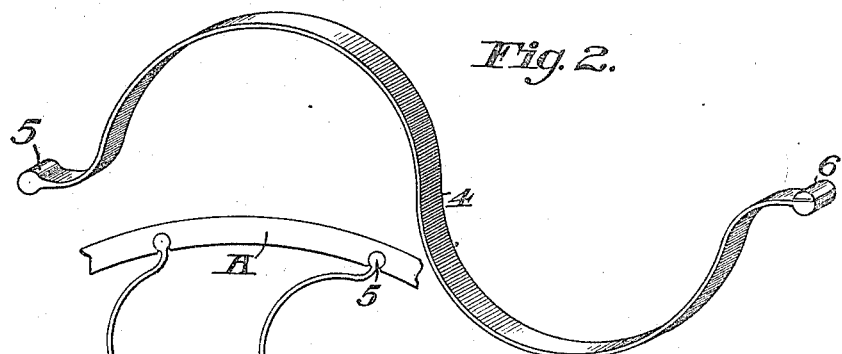
Fig. 2.
Fig. 3.
WITNESSES:
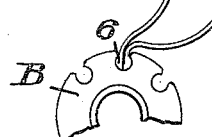
INVENTOR
David E. Bohannon.
BY Strong Townsend
ATTORNEYS D. E. BOHANNON.
RESILIENT WHEEL.
APPLICATION FILED FEB. 3, 1916.
1,249,273.
Patented Dec. 4, 1917.
2 SHEETS—SHEET 2.
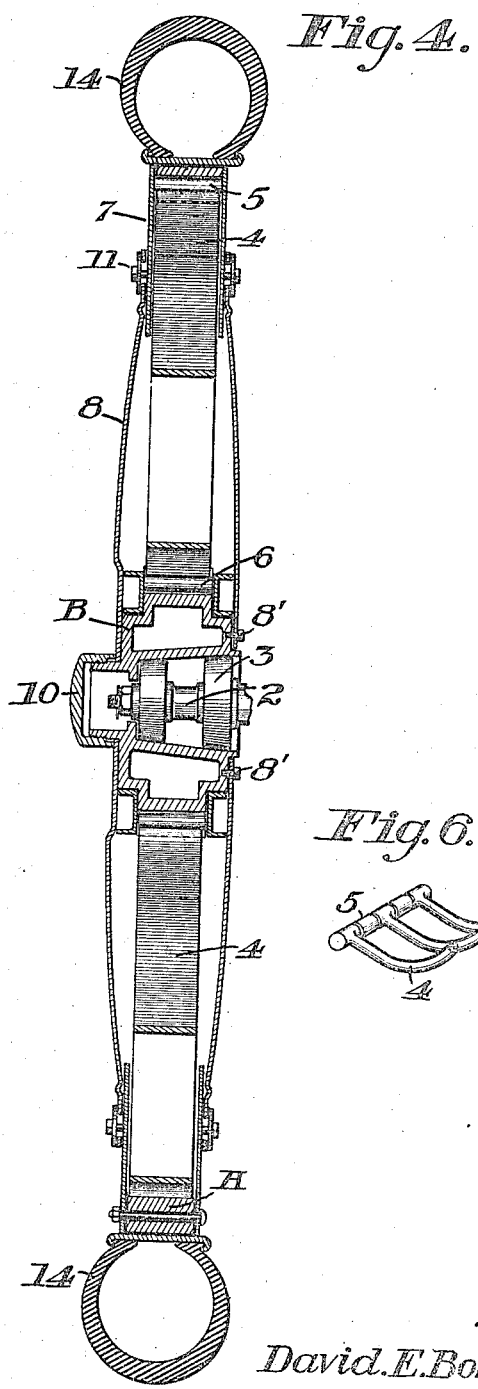
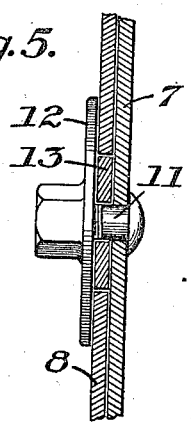
WITNESSES:
B. M. Doolin
L. J. Forde
INVENTOR
David. E. Bohannon.
BY Strong & Townsend
ATTORNEYS

UNITED STATES PATENT OFFICE.

DAVID E. BOHANNON, OF SAN FRANCISCO, CALIFORNIA, ASSIGNOR, BY MESNE ASSIGNMENTS, TO RED STAR WHEEL COMPANY, OF SEATTLE, WASHINGTON, A CORPORATION OF WASHINGTON.

RESILIENT WHEEL.

1,249,273.   Specification of Letters Patent.   Patented Dec. 4, 1917.

Application filed February 3, 1916. Serial No. 75,936.

*To all whom it may concern:*

Be it known that I, DAVID E. BOHANNON, a citizen of the United States, residing at the city and county of San Francisco and State of California, have invented new and useful Improvements in Resilient Wheels of which the following is a specification.

My invention relates to improvements in wheels of that class in which elastic metallic springs are fixed between the hub and rim to effect the distinct resilient action.

The invention consists in the employment of a series of double reversely curved springs tensionally extended between the outer-felly and the hub of a wheel, "inclosing" disks upon each side extending outwardly from the hub and annular co-acting disks, having the outer periphery fixed to the felly and the inner edge overlapping and slidable on the inner disks, but with means to lock the outer and inner disks rigidly together when desired. It also comprises details of construction which will be more fully explained by reference to the accompanying drawings, in which—

Figure 1 is a side view of the wheel with the outer disks removed.

Fig. 2 is a perspective view of a single spring.

Fig. 3 is a portion of a wheel showing reinforcement of springs.

Fig. 4 is a transverse section through line 4—4 of Fig. 1.

Fig. 5 is an enlarged section showing overlapping of the disks and devices for uniting them rigidly.

Fig. 6 is a fragment showing a modification of the springs.

Various arrangements of metallic springs have been employed between the hub and felly of a wheel to render such wheel resilient. In my invention I employ reversely curved springs which may occupy the position of the usual spokes, extending between the hub and felly of a wheel, said springs being provided at the ends with heads capable of oscillation in coacting sockets, and having such a tension that the load is largely supported by suspension in the wheel instead of by direct pressure. The reverse curvature of the springs acts to divide the expanding and contracting movements.

As shown A is the felly of a wheel and B the hub; made hollow and the axle 2 extends into the hub. Antifrictional roller or ball bearings 3 are fitted between the axle and hub as shown; 4 represents springs which may be flat, round, or otherwise suitably shaped in cross section. These springs are reversely curved, and at the ends have transverse cylindrical enlargements 5 and 6 which fit into correspondingly shaped sockets in the felly and the hub.

I have shown the hub ends of these enlargements, made in two parts, one being forged with the spring end and the other as a semi-cylindrical member or filler which fits against the first portion to complete the cylinder and retain the end in place. The ends thus constructed are free to rotate in their sockets, and thus yield to the movements of the connected parts. By making one of these ends semi-cylindrical, one end of the spring may first be inserted to its seat and the other end may then be easily entered and afterward rotatively secured in place by a semi-cylindrical locking piece which coacts with the cylindrical spring end, as seen in Figs. 1 and 3, the filter piece in Fig. 3 having a second spring attached thereto. It also enables a combination of spring spokes, in which the semi-cylindrical inner ends of two sprngs maybe inserted in one hub socket, while the outer ends may fit into adjacent felly sockets, as shown in Fig. 3. In this manner any desired stiffness may be imparted to the springs without reducing the flexibility of the individual spring members. This effect may be produced by employing a number of round springs, side by side as shown in Fig. 6.

The interior of the wheel is inclosed, by metallic disks upon opposite sides, so disposed as to allow the necessary resilient movements of the spring connections between the felly and the hub. Annular disks 7 are fixed to the sides of the felly and extending toward the hub as shown. Disks 8 are fixed to the hub ends and converge outwardly so as to overlap the inner edges of the disks 7. The inner disk may be secured to the hub by bolts 8', and the outer one may be secured by the hub cap 10. The outer periphery of each disk 8, has holes stamped or otherwise made through it and bolts 11 unite the two disks, passing through the holes, with washers 12 of such size as to cover the holes, and said holes are large enough to allow the required movement between the hub and felly by reason of the yielding of the spring spokes. If it be desired to make the wheel entirely rigid, it may be done by inserting disks 13 into each of the openings in the disk 8 and passing the securing bolts 11 through these disks 13 filling the surrounding space and this will rigidly unite the main disks and make the wheel rigid. Pneumatic or solid tires may be employed at will, as at 14.

In addition to bearing the load with a sufficiently elastic tension, the springs are designed to resist the normal twisting strain of the driving axle, and if this twist is increased beyond the elastic limit of the springs, the twisting strain upon the driving axle communicated to the inner disk 8 will advance it with relation to the outer disk, until the bolts 11 contact with the sides of the holes in which the bolts are normally free to move. When this contact takes place, it will be obvious the driving force will be applied directly to the wheel without any yielding or elastic action and the springs will be relieved from any overstrain.

Having thus described my invention, what I claim and desire to secure by Letters Patent is—

1. In a wheel of the character described, a hub and a felly having transverse cylindrical openings, reversely curved springs having cylindrical heads at one end fitting corresponding openings, the opposite ends having semi-cylindrical heads and filling means fitted to complete the heads and rotatably secure them in the sockets.

2. In a wheel, a hub and an encircling felly, the hub having curved seats opening through its periphery and the felly having curved seats opening through its inner circumference, and spring means supporting the felly from the hub including a spring having ends curved to conform to that of the seats and engaging in respective ones of the felly and hub seats, one of said ends being partly cylindrical, and a locking member fitting the partly cylindrical end and turnable therewith in its seat.

In testimony whereof I have hereunto set my hand in the presence of two subscribing witnesses.

DAVID E. BOHANNON.

Witnesses:
JOHN H. HERRING,
W. W. HEALEY.

Copies of this patent may be obtained for five cents each, by addressing the "Commissioner of Patents, Washington, D. C."